US012803160B2

(12) United States Patent
Yin et al.

(10) Patent No.: US 12,803,160 B2
(45) Date of Patent: Nov. 17, 2026

(54) ANTENNA DEVICES AND SMART TELEVISIONS

(71) Applicant: SHENZHEN TCL DIGITAL TECHNOLOGY LTD., Shenzhen (CN)

(72) Inventors: Liuzhong Yin, Shenzhen (CN); Jiahui Luo, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 94 days.

(21) Appl. No.: 18/579,355

(22) PCT Filed: May 10, 2022

(86) PCT No.: PCT/CN2022/091833

§ 371 (c)(1),
(2) Date: Jan. 14, 2024

(87) PCT Pub. No.: WO2023/010930

PCT Pub. Date: Feb. 9, 2023

(65) Prior Publication Data

US 2024/0347902 A1 Oct. 17, 2024

(30) Foreign Application Priority Data

Aug. 4, 2021 (CN) ......................... 202121812398.0

(51) Int. Cl.
*H01Q 1/52* (2006.01)
*H01Q 1/22* (2006.01)
(Continued)

(52) U.S. Cl.
CPC ........... *H01Q 1/521* (2013.01); *H01Q 1/2291* (2013.01); *H01Q 5/371* (2015.01); *H01Q 9/0414* (2013.01); *H01Q 9/42* (2013.01); *H01Q 13/106* (2013.01)

(58) Field of Classification Search
CPC .......... H01Q 21/28; H01Q 1/521; H01Q 9/42; H01Q 1/2291; H01Q 9/0414;
(Continued)

(56) References Cited

U.S. PATENT DOCUMENTS

2016/0049736 A1* 2/2016 Liu ........................ H01Q 21/28
343/893
2018/0076504 A1* 3/2018 Lo Hine Tong ....... H01Q 9/045
(Continued)

FOREIGN PATENT DOCUMENTS

CN 107369881 A 11/2017
CN 207338619 U 5/2018
(Continued)

OTHER PUBLICATIONS

WO-2021088165-A1 (Year: 2021).*
(Continued)

*Primary Examiner* — Dameon E Levi
*Assistant Examiner* — Gurbir Singh
(74) *Attorney, Agent, or Firm* — PV IP PC; Wei Te Chung

(57) ABSTRACT

Disclosed herein are an antenna device and a smart television. The antenna device includes a first WIFI antenna, a Bluetooth antenna, and a second WIFI antenna, the Bluetooth antenna is provided between the first WIFI antenna and the second WIFI antenna, conductor portions are provided between the Bluetooth antenna and the first WIFI antenna, and between the Bluetooth antenna and the second WIFI antenna, respectively, and the conductor portions are grounded.

7 Claims, 2 Drawing Sheets

(51) Int. Cl.

| | |
|---|---|
| ***H01Q 5/371*** | (2015.01) |
| ***H01Q 9/04*** | (2006.01) |
| ***H01Q 9/42*** | (2006.01) |
| ***H01Q 13/10*** | (2006.01) |

(58) Field of Classification Search

CPC ...... H01Q 13/106; H01Q 5/371; H01Q 1/243; H01Q 1/38; H01Q 1/22; H01Q 13/10; H01Q 1/40; H01Q 1/32

See application file for complete search history.

(56) References Cited

U.S. PATENT DOCUMENTS

| | | | | |
|---|---|---|---|---|
| 2018/0123242 | A1* | 5/2018 | Jeon | H01Q 5/30 |
| 2018/0220109 | A1* | 8/2018 | Nakamura | G06F 1/1601 |
| 2018/0287259 | A1 | 10/2018 | Svendsen et al. | |

FOREIGN PATENT DOCUMENTS

| | | | | |
|---|---|---|---|---|
| CN | 208675427 U | | 3/2019 | |
| CN | 215933813 U | | 3/2022 | |
| JP | 2014192768 A | | 10/2014 | |
| WO | WO-2021088165 A1 | * | 5/2021 | H04L 12/10 |

OTHER PUBLICATIONS

WO-2021088165-A1 Translation (Year: 2018).*

European Search Report in European application No. 22851649.8, mailed on Mar. 3, 2025.

International Search Report in International application No. PCT/CN2022/091833, mailed on Jun. 27, 2022.

Written Opinion of the International Search Authority in International application No. PCT/CN2022/091833, mailed on Jun. 27, 2022.

* cited by examiner

ANTENNA DEVICES AND SMART TELEVISIONS

This application claims priority to Chinese Patent Application No. 202121812398.0, filed in the China National Intellectual Property Administration on Aug. 4, 2021, entitled "ANTENNA DEVICE AND SMART TELEVISION", which is incorporated herein by reference in its entirety.

TECHNICAL FIELD

The present disclosure relates to a field of communication technology, and more particularly, to antenna devices and smart televisions.

BACKGROUND

Most of the existing smart televisions are equipped with a WIFI module and a Bluetooth module. The WIFI module can realize networking of the televisions, and the Bluetooth module can realize remote control of the televisions. However, the WIFI module and the Bluetooth module transmit signals in the same or similar frequency band. At the time of assembly, the WIFI module and the Bluetooth module need to have a high isolation to prevent the transmission signals of the WIFI module and the Bluetooth module from interfering with each other, and the WIFI module and the Bluetooth module cannot be installed at a close distance, thereby causing the Bluetooth module and the WIFI module to transmit forward wireless signals weakly.

SUMMARY

Technical Problem

At the time of assembly, the WIFI module and the Bluetooth module need to have a high isolation to prevent the transmission signals of the WIFI module and the Bluetooth module from interfering with each other, and the WIFI module and the Bluetooth module cannot be installed at a close distance, thereby causing the Bluetooth module and the WIFI module to transmit forward wireless signals weakly.

Solution to Technical Problem

Technical Solution

According to a first aspect, an embodiment of the present disclosure provides an antenna device including a first WIFI antenna, a Bluetooth antenna, and a second WIFI antenna, the Bluetooth antenna is disposed between the first WIFI antenna and the second WIFI antenna, conductor portions are disposed between the Bluetooth antenna and the first WIFI antenna, and between the Bluetooth antenna and the second WIFI antenna, respectively, and the conductor portions are grounded.

According to a second aspect, an embodiment of the present disclosure further provides a smart television including an antenna device, the antenna device includes a first WIFI antenna, a Bluetooth antenna, and a second WIFI antenna, the Bluetooth antenna is disposed between the first WIFI antenna and the second WIFI antenna, conductor portions are disposed between the Bluetooth antenna and the first WIFI antenna, and between the Bluetooth antenna and the second WIFI antenna, respectively, and the conductor portions are grounded.

Advantages of Invention

Beneficial Effect

In the antenna device provided in the embodiment of the present disclosure, a Bluetooth antenna is disposed between a first WIFI antenna and a second WIFI antenna, and grounding conductor portions are disposed between the Bluetooth antenna and the first WIFI antenna, and between the Bluetooth antenna and the second WIFI antenna, respectively, so that coupling magnetic fields induced by the Bluetooth antenna and the first WIFI antenna and the second WIFI antenna are isolated from each other, the Bluetooth antenna and the first WIFI antenna and the second WIFI antenna are installed in close proximity, and the forward signal transmission of the Bluetooth antenna, the first WIFI antenna and the second WIFI antenna are enhanced.

BRIEF DESCRIPTION OF THE DRAWINGS

Description of Drawings

Figure 1:
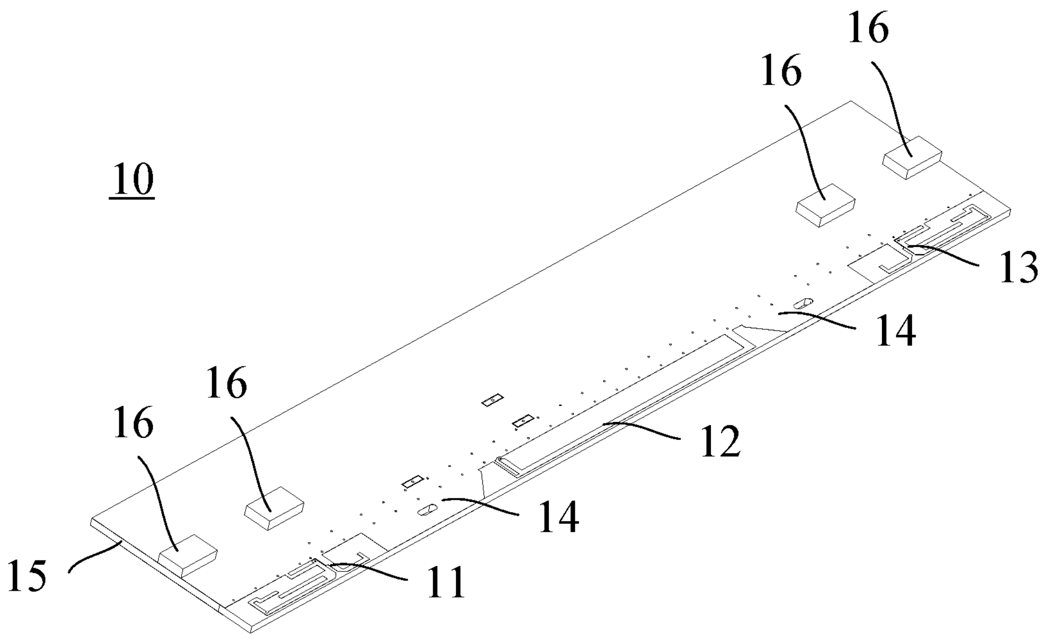

FIG. 1 is a perspective structural diagram of an antenna device according to an embodiment of the present disclosure.

Figure 2:
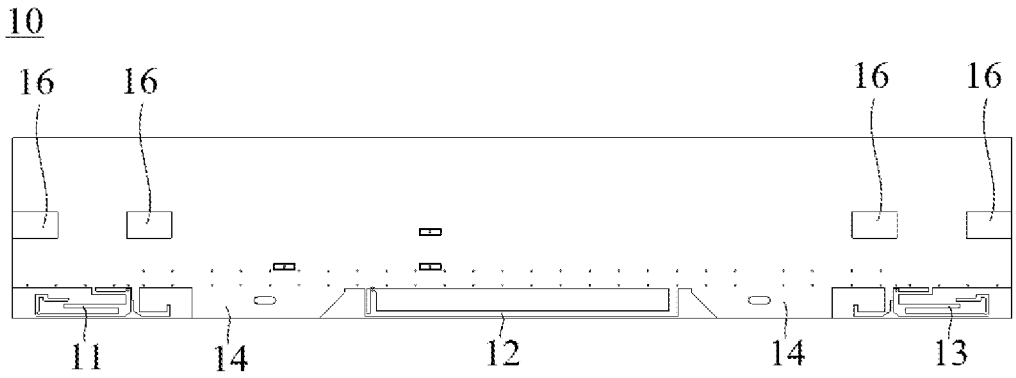

FIG. 2 is a top view of the antenna device of FIG. 1.

Figure 3:
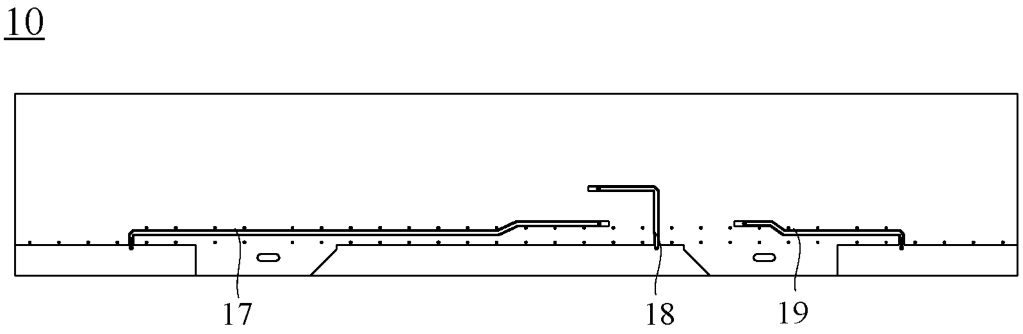

FIG. 3 is a bottom view of the antenna device of FIG. 1.

Figure 4:
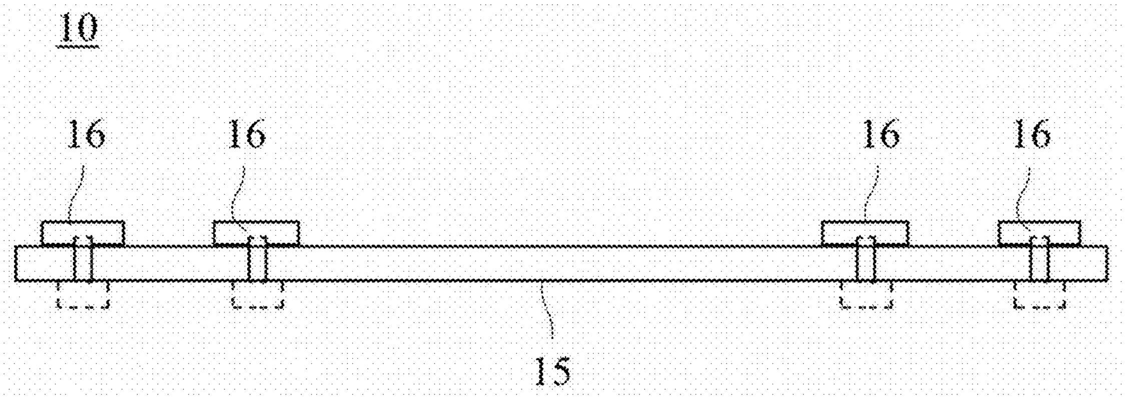

FIG. 4 is a front view of the antenna device of FIG. 1.

Figure 5:
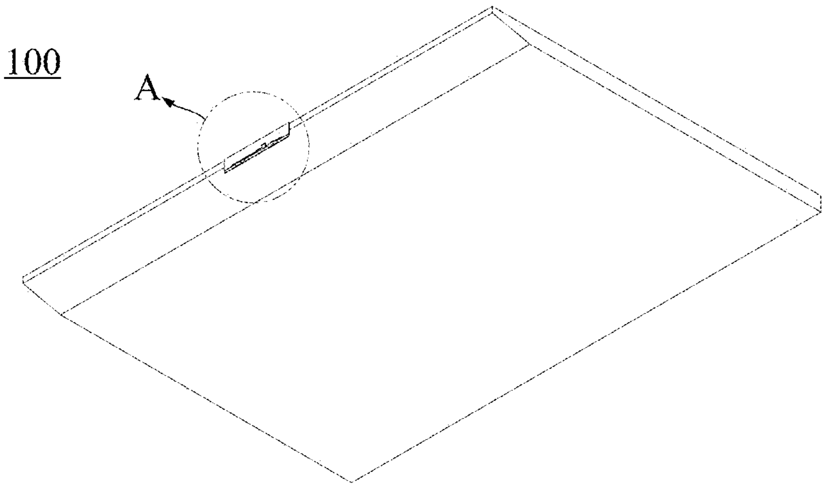

FIG. 5 is a schematic structural diagram of a smart television according to an embodiment of the present disclosure.

Figure 6:
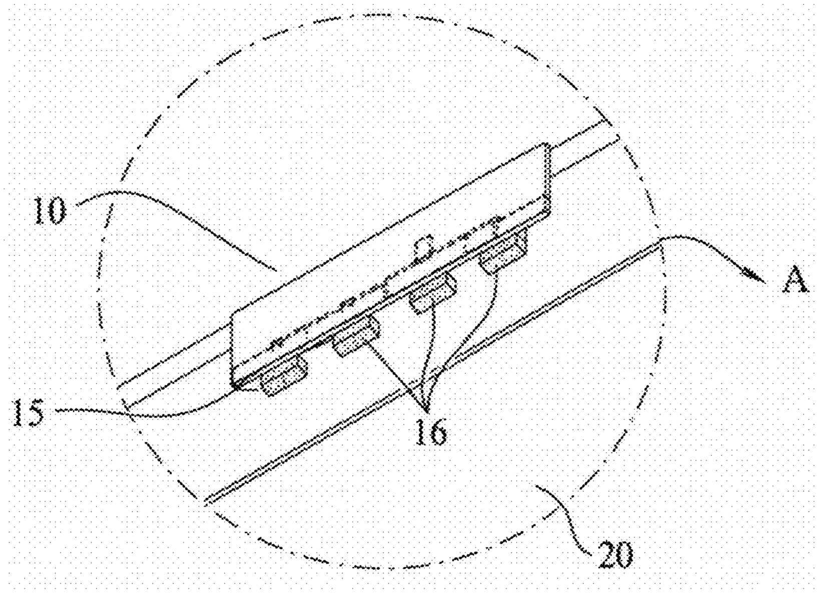

FIG. 6 is a partially enlarged view of FIG. 5.

EMBODIMENTS OF INVENTION

Detailed Description

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it is to be understood that the term "first", "second", and the like, are only used to distinguish similar objects, and cannot be construed as indicating or imposing a relative importance or implicitly indicating the number of technical features indicated.

Embodiments of the present disclosure provide antenna devices and smart televisions. The antenna device may overcome a problem that a WIFI module and a Bluetooth module cannot be installed close to each other, resulting in a weak wireless signal transmitted forward by the Bluetooth module and the WIFI module. The following description will be made in conjunction with the accompanying drawings.

Referring to FIGS. 1 and 2, FIG. 1 is a perspective view of an antenna device according to an embodiment of the present disclosure, and FIG. 2 is a top view of the antenna device of FIG. 1.

An embodiment of the present disclosure provides an antenna device 10, the antenna device 10 includes a first WIFI antenna 11, a Bluetooth antenna 12, and a second WIFI antenna 13. The Bluetooth antenna 12 is disposed between the first WIFI antenna 11 and the second WIFI antenna 13. Conductor portions 14 are provided between the Bluetooth antenna 12 and the first WIFI antenna 11, and between the Bluetooth antenna 12 and the second WIFI antenna 13, respectively. The conductor portion 14 is grounded.

The bandwidth of the first WIFI antenna 11, the Bluetooth antenna 12, and the second WIFI antenna 13 may meet 2.4 GHz to 2.5 GHz in the low frequency band and 5 GHz to 7.2 GHz in the high frequency band. When in the low frequency band, there is a high isolation between the first WIFI antenna 11, the Bluetooth antenna 12, and the second WIFI antenna 13, and the isolation is 19 dB. The first WIFI antenna 11, the Bluetooth antenna 12, and the second WIFI antenna 13 may achieve maximum forward gain with a beam width within ±20 degrees in a forward direction, which meets the requirements of the horizontal directional radiation.

It may be appreciated that the Bluetooth antenna 12 is disposed between the first WIFI antenna 11 and the second WIFI antenna 13, and grounded conductor portions 14 are disposed between the Bluetooth antenna 12 and the first WIFI antenna 11 and between the Bluetooth antenna 12 and the second WIFI antenna 13, respectively, so that the coupling magnetic fields induced by the Bluetooth antenna 12 and the WIFI antennas are isolated from each other, the Bluetooth antenna 12 and the first WIFI antenna 11 and the second WIFI antenna 13 are closely mounted, and the forward signal transmission of the Bluetooth antenna 12 and the first WIFI antenna 11 and the second WIFI antenna 13 is enhanced.

The first WIFI antenna or the second WIFI antenna is a PIFA antenna, and the Bluetooth antenna 12 is a slot antenna. The slot antenna is an antenna, also referred to as a slotted antenna, which is formed by forming slits in the surface of the conductor. When the slot antenna is disposed between the first WIFI antenna 11 and the second WIFI antenna 13, since the gain at both sides of the Bluetooth antenna 12 is lowest, mutual signal receiving capability between the Bluetooth antenna 12 and the first WIFI antenna 11 and the second WIFI antenna 13, which are at both sides of the Bluetooth antenna 12, is weakest, thereby improving the isolation between the first WIFI antenna 11, the Bluetooth antenna 12 and the second WIFI antenna 13.

The conductor portion 14 is a convex metal step, and it may be understood that the design of the conductor portion 14 as the metal step facilitates an increase in the ground area and further increases the isolation between the antennas.

The antenna device 10 further includes a substrate 15 on which the first WIFI antenna 11, the Bluetooth antenna 12, and the second WIFI antenna 13 are all disposed. The dielectric substrate 15 may be a FR-4 epoxy glass cloth laminate, and the substrate 15 has stable electrical insulation performance, good flatness, smooth surface, no pits, and a standard thickness tolerance, and is suitable for a product with high-performance electronic insulation requirements. The substrate 15 has a thickness of 1 mm. It may be appreciated that the first WIFI antenna 11, the Bluetooth antenna 12, and the second WIFI antenna 13 may be integrated on one surface of the substrate 15, and the feed network layout may be provided on another surface of the substrate 15 opposite to the first WIFI antenna 11, the Bluetooth antenna 12, and the second WIFI antenna 13, so that the two surfaces of the substrate 15 are fully utilized, thereby improving integration level. The upper and lower surfaces of the substrate 15 are covered with a metal plate, which may be made of copper, aluminum, or the like, and may have a thickness of 0.5 to 1 ounce. The first WIFI antenna 11, the Bluetooth antenna 12, and the second WIFI antenna 13 may be formed by etching the metal plate.

The first WIFI antenna 11, the Bluetooth antenna 12, and the second WIFI antenna 13 are provided at the same side edge of the substrate 15. It may be understood that the first WIFI antenna 11, the Bluetooth antenna 12, and the second WIFI antenna 13 may be in a position relationship in a same line. In this case, the gain of both sides of the Bluetooth antenna 12 is low, and the isolation between the first WIFI antenna 11, the Bluetooth antenna 12, and the second WIFI antenna 13 are further improved.

Referring to FIG. 3, FIG. 3 is a bottom view of the antenna device 10 of FIG. 1.

The antenna device 10 further includes a WIFI signal source and a Bluetooth signal source, both the WIFI signal source and the Bluetooth signal source are provided on the substrate 15, the WIFI signal source is electrically connected to the first WIFI antenna 11 and the second WIFI antenna 13, and the Bluetooth signal source is electrically connected to the Bluetooth antenna 12. It may be appreciated that the WIFI signal source causes the first WIFI antenna 11 and the second WIFI antenna 13 to transmit WIFI signals, and the Bluetooth signal source causes the Bluetooth antenna 12 to transmit Bluetooth signals. The WIFI signal source and the Bluetooth signal source are integrated into one chip. The backside of the substrate 15 is provided with a first WIFI microstrip line 17, a Bluetooth microstrip line 18, and a second WIFI microstrip line 19. The WIFI signal source and the Bluetooth signal source may be provided on the backside of the substrate 15. The WIFI signal source is connected to the first WIFI microstrip line 17 and the second WIFI microstrip line 19, and the Bluetooth signal source is connected to the Bluetooth microstrip line 18, so that signals are provided to the first WIFI antenna 11, the Bluetooth antenna 12, and the second WIFI antenna 13. It may be understood that the WIFI signal source and the Bluetooth signal source may be provided on the backside of the substrate 15 to improve integration level.

With continued reference to FIGS. 2 and 4, FIG. 4 is a front view of the antenna device 10 of FIG. 1.

The substrate 15 is further provided with a plurality of grounding structures 16, which are disposed opposite and electrically connected to the first WIFI antenna 11, the Bluetooth antenna 12, and the second WIFI antenna 13, each of which is grounded. The plurality of grounding structures 16 are arranged in parallel on a straight line, and the straight line formed by the plurality of grounding structures 16 is parallel to the straight line formed by the first WIFI antenna 11, the Bluetooth antenna 12, and the second WIFI antenna 13 which are sequentially arranged. The plurality of grounding structures 16 facilitate conversion of vertical polarization characteristics, enhance forward wireless coverage, and achieve better omnidirectional coverage. The grounding structure 16 may be in a grounding form in which the grounding structure 16 is grounded by a wire, or a plurality of grounding structures 16 may be connected to a grounding metal plate.

The grounding structure 16 may include conductive foam, which is electrically connected to the first WIFI antenna 11, the Bluetooth antenna 12, and the second WIFI antenna 13, and is grounded. The conductive foam means that a conductive cloth or a metal coating is coated on the flame retardant sponge so that the flame retardant sponge has good surface conductivity and can be fixed by an adhesive tape. It may be appreciated that when the grounding structure 16 is a conductive foam, the conductive foam protrudes from the substrate 15, and when the grounding structure 16 needs to be connected to the grounding metal plate, the conductive foam may abut the grounding metal plate, thereby causing the conductive foam to be grounded. In addition, the conductive foam is relatively soft and has an impact resistance characteristic.

Referring to FIGS. 5 and 6, FIG. 5 is a schematic structural diagram of a smart television set according to an embodiment of the present disclosure, and FIG. 6 is a partially enlarged view of FIG. 5.

An embodiment of the present disclosure further provides a smart television 100 including the antenna device 10 described above. The antenna device 10 may be suspended from a metal backplane of the smart television 100, thereby saving space. The antenna device 10 and the metal backplane may be connected in such a manner as a screw fixing, an adhesive, or the like. The metal backplane is grounded. When the antenna device 10 is connected to the metal backplane, the conductive foam on the antenna device 10 may abut the metal backplane, so that the conductive foam is well connected to the metal backplane and no other grounding wires are required, thereby further saving space and reducing cost.

The television further includes a voice sensor and an infrared sensor, and the antenna device 10, the voice sensor and the infrared sensor are integrated on the same circuit board. It may be appreciated that the antenna device 10, the voice sensor, and the infrared sensor are integrated on the same circuit board with high integration in order to further reduce the cost and save space, while ensuring the performance of the television.

According to the antenna device 10 provided in the embodiment of the present disclosure, a Bluetooth antenna 12 is disposed between the first WIFI antenna 11 and the second WIFI antenna 13, and the grounded conductor portions 14 are disposed between the Bluetooth antenna 12 and the first WIFI antenna 11 and between the Bluetooth antenna 12 and the second WIFI antenna 13 respectively, so that coupling magnetic fields induced by the Bluetooth antenna 12 and the first WIFI antenna 12 and the second WIFI antenna 13 are isolated from each other, the Bluetooth antenna 12 and the first WIFI antenna 11 and the second WIFI antenna 13 are closely mounted, and the forward signal transmission of the Bluetooth antenna 12 and the first WIFI antenna 11 and the second WIFI antenna 13 is enhanced.

The antenna device and the smart television provided by the embodiment of the present disclosure are described in detail above. The principles and embodiments of the present disclosure have been described with reference to specific embodiments, and the description of the above embodiments is merely intended to aid in the understanding of the present disclosure. At the same time, changes may be made by those skilled in the art to both the specific implementations and the scope of application in accordance with the teachings of the present disclosure. In view of the foregoing, the content of the present specification should not be construed as limiting the disclosure.

What is claimed is:

1. An antenna device, comprising:

a first WIFI antenna, a Bluetooth antenna, a second WIFI antenna, and a substrate, wherein the first WIFI antenna, the Bluetooth antenna, and the second WIFI antenna are all disposed on the substrate, the Bluetooth antenna is disposed between the first WIFI antenna and the second WIFI antenna, wherein conductor portions are disposed between the Bluetooth antenna and the first WIFI antenna, and between the Bluetooth antenna and the second WIFI antenna, respectively, and the conductor portions are grounded;

wherein the Bluetooth antenna is a slot antenna, the first WIFI antenna or the second WIFI antenna is a PIFA antenna, each of the conductor portions is a convex metal step, the substrate is further provided with a plurality of grounding structures arranged in parallel on a straight line, and the plurality of grounding structures comprise a conductive foam electrically connected to the first WIFI antenna, the Bluetooth antenna, and the second WIFI antenna;

wherein the plurality of grounding structures are arranged in a direction parallel to an arrangement direction of the first WIFI antenna, the Bluetooth antenna, and the second WIFI antenna on the substrate, and the conductive foam protrudes from the substrate and is configured to directly contact a metal backplane when the antenna device is mounted to the metal backplane so as to provide grounding without an additional grounding wire, thereby simultaneously achieving magnetic coupling isolation among the antennas and enhancement of forward radiation of the first WIFI antenna, the Bluetooth antenna, and the second WIFI antenna.

2. The antenna device according to claim 1, wherein the first WIFI antenna, the Bluetooth antenna, and the second WIFI antenna are provided at a same side edge of the substrate.

3. The antenna device according to claim 1, wherein the plurality of grounding structures are disposed opposite and electrically connected to the first WIFI antenna, the Bluetooth antenna, and the second WIFI antenna, each of the plurality of grounding structures is grounded.

4. A smart television comprising an antenna device, wherein the antenna device comprises:

a first WIFI antenna, a Bluetooth antenna, a second WIFI antenna, and a substrate, wherein the first WIFI antenna, the Bluetooth antenna, and the second WIFI antenna are all disposed on the substrate, the Bluetooth antenna is provided between the first WIFI antenna and the second WIFI antenna, wherein conductor portions are provided between the Bluetooth antenna and the first WIFI antenna, and between the Bluetooth antenna and the second WIFI antenna, respectively, and the conductor portions are grounded;

wherein the Bluetooth antenna is a slot antenna, the first WIFI antenna or the second WIFI antenna is a PIFA antenna, each of the conductor portions is a convex metal step, the substrate is further provided with a plurality of grounding structures arranged in parallel on a straight line, and the plurality of grounding structures comprise a conductive foam electrically connected to the first WIFI antenna, the Bluetooth antenna, and the second WIFI antenna;

wherein the plurality of grounding structures are arranged in a direction parallel to an arrangement direction of the first WIFI antenna, the Bluetooth antenna, and the second WIFI antenna on the substrate, and the conductive foam protrudes from the substrate and is configured to directly contact a metal backplane when the antenna device is mounted to the metal backplane so as to provide grounding without an additional grounding wire, thereby simultaneously achieving magnetic coupling isolation among the antennas and enhancement of forward radiation of the first WIFI antenna, the Bluetooth antenna, and the second WIFI antenna.

5. The smart television according to claim 4, wherein the first WIFI antenna, the Bluetooth antenna, and the second WIFI antenna are provided at a same side edge of the substrate.

6. The smart television according to claim 4, wherein the antenna device further comprises a WIFI signal source and a Bluetooth signal source, the WIFI signal source and the Bluetooth signal source are both disposed on the substrate, the WIFI signal source is electrically connected to the first WIFI antenna and the second WIFI antenna, and the Bluetooth signal source is electrically connected to the Bluetooth antenna.

7. The smart television according to claim 4, wherein the plurality of grounding structures are disposed opposite and electrically connected to the first WIFI antenna, the Bluetooth antenna, and the second WIFI antenna, each of the plurality of grounding structures is grounded.

* * * * *